US009378299B1

(12) United States Patent
Rashidi

(10) Patent No.: US 9,378,299 B1
(45) Date of Patent: Jun. 28, 2016

(54) BROWSING PAGES IN AN ELECTRONIC DOCUMENT

(71) Applicant: Google Inc., Mountain View, CA (US)

(72) Inventor: Paul Rashidi, Dublin, CA (US)

(73) Assignee: Google Inc., Mountain View, CA (US)

( * ) Notice: Subject to any disclaimer, the term of this patent is extended or adjusted under 35 U.S.C. 154(b) by 148 days.

(21) Appl. No.: 14/078,287

(22) Filed: Nov. 12, 2013

Related U.S. Application Data

(60) Provisional application No. 61/821,446, filed on May 9, 2013.

(51) Int. Cl.
*G06F 7/00* (2006.01)
*G06F 17/30* (2006.01)

(52) U.S. Cl.
CPC .... *G06F 17/30899* (2013.01); *G06F 17/30058* (2013.01); *G06F 17/30572* (2013.01)

(58) Field of Classification Search
None
See application file for complete search history.

(56) References Cited

U.S. PATENT DOCUMENTS

| | | | | |
|---|---|---|---|---|
| 6,243,071 | B1 * | 6/2001 | Shwarts | G06F 3/0483 715/776 |
| 2002/0126120 | A1 * | 9/2002 | Snowdon et al. | 345/440 |
| 2004/0164975 | A1 * | 8/2004 | Ho | G06F 3/0483 345/204 |
| 2005/0171946 | A1 * | 8/2005 | Maim | 707/5 |
| 2005/0188300 | A1 * | 8/2005 | Sweet et al. | 715/514 |

* cited by examiner

*Primary Examiner* — Uyen Le
(74) *Attorney, Agent, or Firm* — Fenwick & West LLP

(57) ABSTRACT

A user's request for a page to be provided in response to a browse request is fulfilled by determining a candidate set of pages based on the page displayed on the client when the browse request is sent. Scores for those candidate pages are used to rank the candidate pages and a page is provided to the client based on the ranking of the candidate pages.

14 Claims, 4 Drawing Sheets

BROWSING PAGES IN AN ELECTRONIC DOCUMENT

CROSS-REFERENCE TO RELATED APPLICATIONS

This application claims the benefit of U.S. Provisional Application No. 61/821,446, filed May 9, 2013, which is hereby incorporated by reference in its entirety.

BACKGROUND

1. Field

This disclosure generally relates to selecting pages of a document to provide a page of interest to a user browsing an electronic document.

2. Description of the Related Art

When browsing a paper magazine, book or other document, a reader stops browsing when the reader reaches a page that looks interesting enough to examine further and then proceeds to examine that page before possibly browsing further. The act of physically browsing a document includes, for some readers, flipping through the document without viewing much if any content on some of the pages. Then something on a page catches the reader's eye and the reader stops to examine that page further. In examining the page further, the reader gathers more information about the page and may decide to start reading the content on the page. Many factors go into a how a page catches a reader's eye and causes the reader to stop browsing at that page. Many of these factors are not ones of which the reader is immediately conscious as he or she stops on a page.

The process of browsing a document is difficult to replicate with an electronic document because the reasons for browsing past a page or stopping to examine a page further in a physical document involve so many different factors. Available readers for electronic documents may provide tools for jumping ahead a predetermined number of pages. However, jumping ahead a fixed number of pages in an electronic document is not a good electronic version of browsing. There is no assessment of the page upon which the reader lands suggesting that that page is more likely to catch the reader's eye as opposed to any other page. For example, the page displayed after jumping ahead may be the middle of an article which is not a page on which a user would stop browsing in a physical document.

Thus, skipping forward or behind a predefined number of pages does not truly provide an electronic equivalent of browsing through a physical book or magazine.

SUMMARY

The above and other needs are met by a method, computer-readable storage medium, and computer system for analyzing and scoring content in an electronic document and then providing content using that score in response to a request from a user requesting content. The system receives a browse request from a client device. That request includes an identifier for the page currently displayed to the user. Based on the current page, the system determines a set of candidate pages to provide to the user. Each of the candidate pages is associated with a score. One of the candidate pages is selected based on the ranking and provided to the client device.

Embodiments of the computer-readable storage medium store computer-executable instructions for performing the steps described above. Embodiments of the computer system further comprise a processor for executing the computer-executable instructions.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
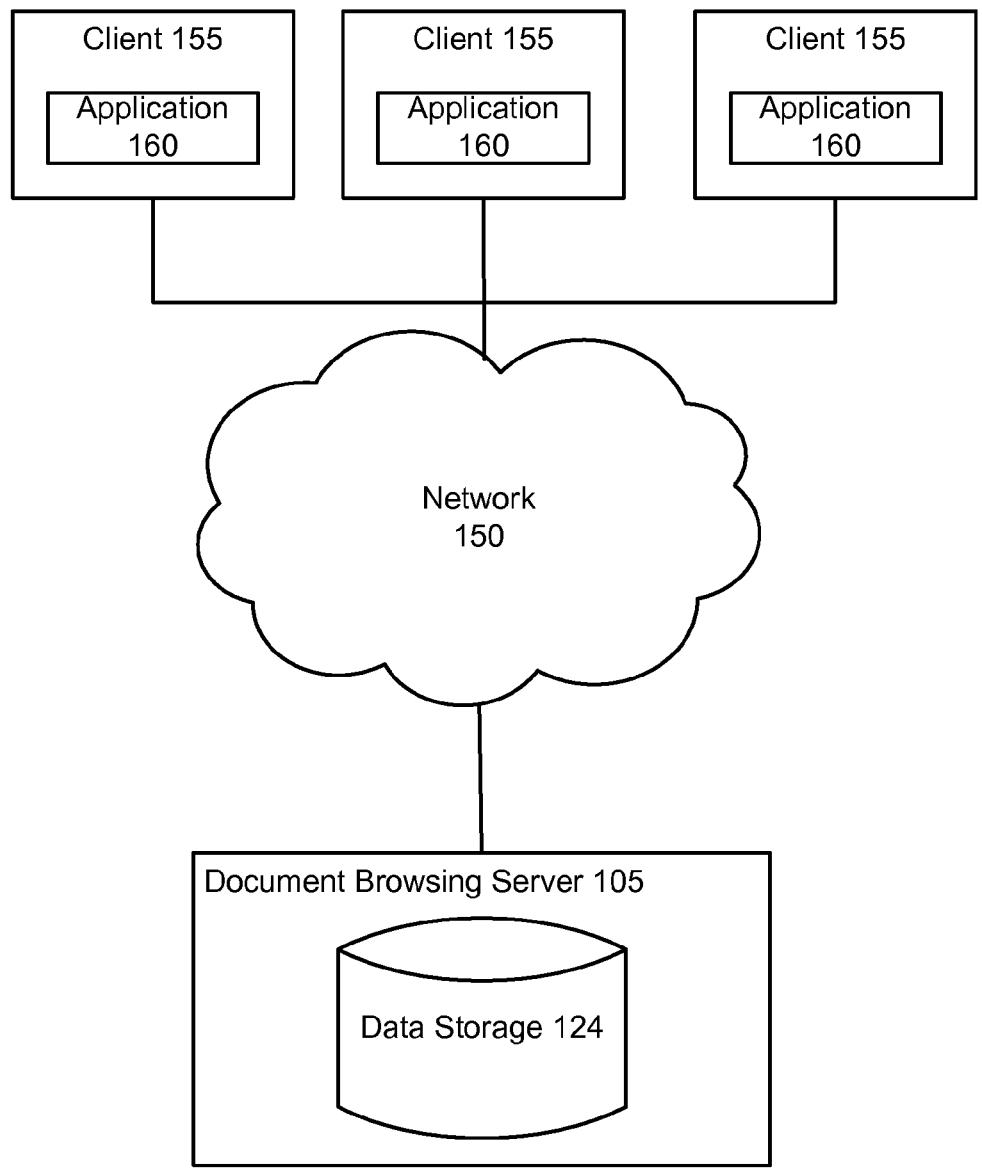
FIG. 1 is a high-level block diagram of a computing environment according to one embodiment.

FIG. 1 is a high-level block diagram of a computing environment 100 according to one embodiment. FIG. 1 illustrates a document browsing server 105 and clients 155 connected by a network 150. Only three clients 155 are shown in FIG. 1 in order to simplify and clarify the description. Embodiments of the computing environment 100 can have thousands or millions of clients 155, as well as multiple document browsing servers 105.

The client 155 is a computer or other electronic device used by one or more users to perform activities including viewing electronic documents and other content received from the document browsing server 105. The client 155, for example, can be a personal computer executing an application 160, such as a web browser, that allows the user to view and browse through electronic documents available from the document browsing server 105. In other embodiments, the client 155 is a network-capable device other than a computer, such as a tablet computer, personal digital assistant (PDA), a mobile telephone (including for example, a smart phone), a pager, a television "set-top box," etc. Client 155 can display the electronic documents in a number of ways. The document may be displayed in a manner that simulates a physical document. The user can view one page at a time or facing pages. The document may also be displayed as a continuous "page" where the user just scrolls down while reading until the end of the document is reached. The client 155 also allows the user to zoom in on a portion of a page. Additionally, a user can click on an image such as a photograph, drawing, graph, etc. and that image is enlarged to be displayed on the full screen of the client 155.

The application 160 includes controls allowing a user to navigate through the document. Example controls include controls to go to a table of contents, to move forward or backward one page and to browse forward or backward in the document. For example, the controls can be buttons on a touch screen, gestures the user makes on the touch screen such as a tap or swipe with one or multiple fingers or hardware buttons on the client 155. In yet another embodiment, the controls are activated with a pointing device attached to the client 155. Upon activating any of these controls, such as a control to browse through the document, a request is sent to the document browsing server 105 which fulfills the request. In an alternative embodiment, the request is fulfilled by the application 160.

The document browsing server 105 provides electronic documents to clients 155 via the network 150, receives user interactions with electronic documents and responds to requests received from the user controls in the application 160 by providing a page within the electronic document. The document browsing server 105 includes a data storage 124 storing electronic documents. The document browsing server 105 further determines scores for pages in electronic documents based on interactions of users with the pages of the stored electronic documents or metadata associated the pages or a combination of both. The document browsing server 105 stores those scores in the data storage 124. These scores are a measure of how interesting a page is and thus an indication of how likely a user is to stop browsing at that page and examine that page further.

In situations in which the document browsing server 105, client 155 or application 160 collects personal information about users, or may make use of personal information, the users may be provided with an opportunity to control whether programs or features collect user information (e.g., information about a user's social network, social actions or activities, profession, a user's preferences, interactions with electronic documents (as discussed in greater detail below) or a user's current location), or to control whether and/or how to receive content from the document browsing server 105 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the document browsing server 105, client 155 and application 160.

In one embodiment, the document browsing server 105 receives a browse request from a user of a client 155 requesting to browse within a document. The browse request is a request for a page without requesting a specific page. The browse request is thus analogous to a user flipping through a physical document such as a magazine or book. To determine the page to provide in response to the browse request the document browsing server 105 ranks a set of candidate pages by the determined scores and determines a page to provide to the user at the client 155 based on the ranking. The browsing server 105 provides this page to the client 155 in response to the browse request. The scoring and ranking of the pages results in providing a page that is likely to be interesting to the user and thus a page the user might stop and examine further if browsing through the physical version of the electronic document. This technique thus provides the user with a useful way of consuming an electronic document.

The network 150 enables communications among the entities connected to it. In one embodiment, the network 150 is the Internet and uses standard communications technologies and/or protocols. Thus, the network 150 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 150 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
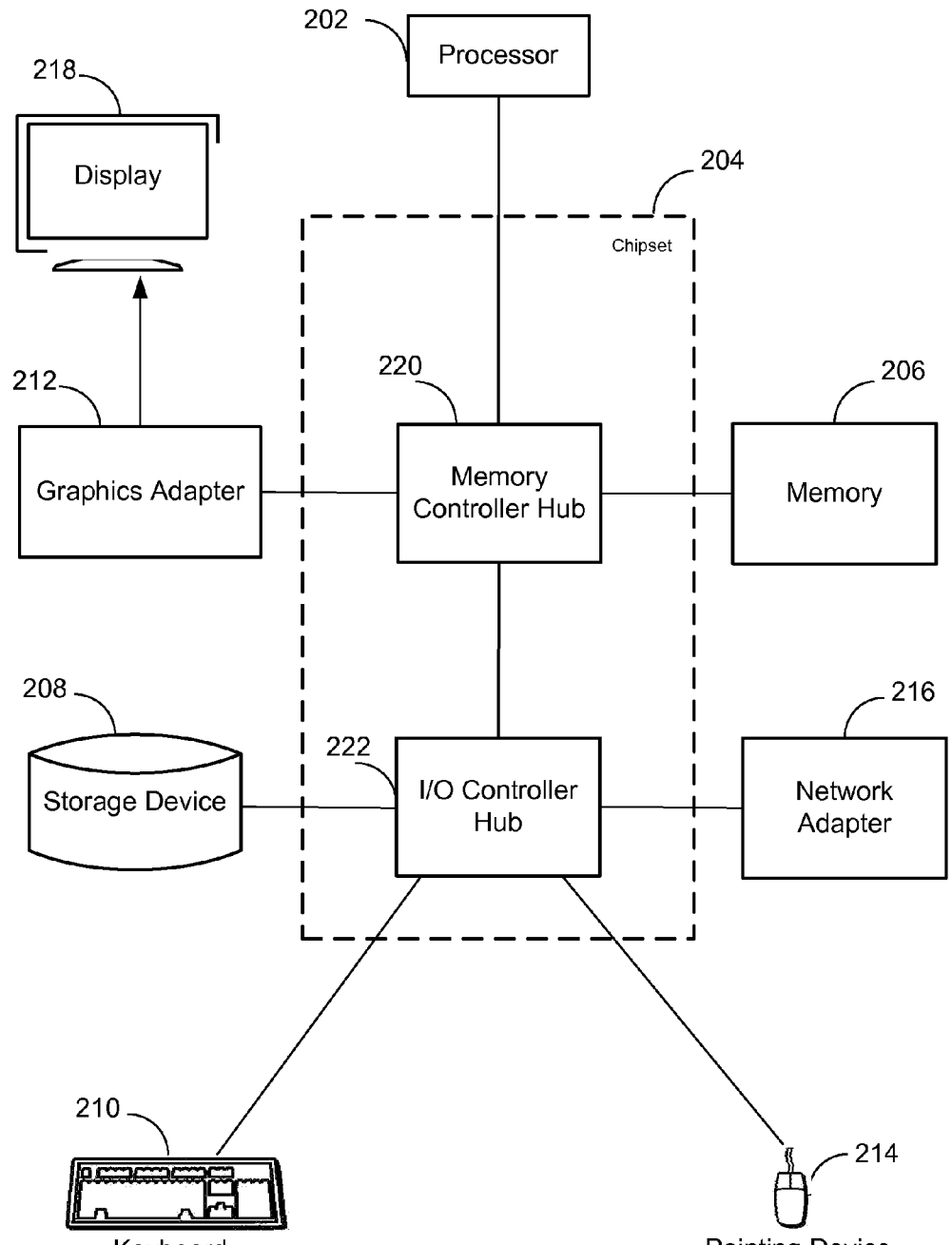
FIG. 2 is a high-level block diagram illustrating an example of a computer for use as a document browsing server and/or client.

FIG. 2 is a high-level block diagram illustrating an example of a computer 200 for use as a document browsing server 105 and/or client 155. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The storage device 208 can be local and/or remote from the computer (such as embodied within a storage area network (SAN)). The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 150. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 155 that is a mobile telephone might have limited processing power, a small display 218, and no pointing device 214. A server-class computer such as that used to implement the document browsing server 105 may be formed of multiple blades and lack a keyboard 210, pointing device 214 and display.

Figure 3:
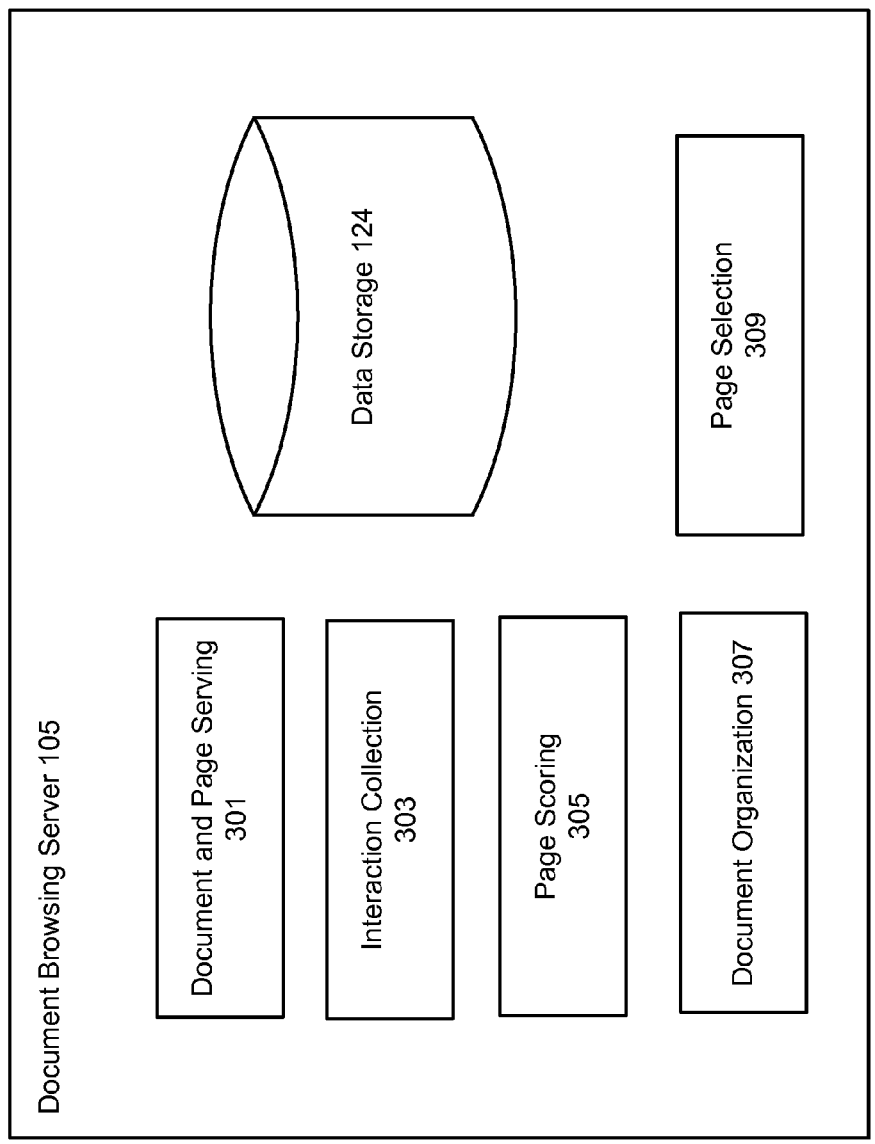
FIG. 3 is a high-level block diagram illustrating modules within the document browsing server according to one embodiment.

FIG. 3 is a high-level block diagram illustrating modules within the document browsing server 105 according to one embodiment. Some embodiments of the document browsing server 105 have different and/or additional modules than the ones described here. Similarly, the functions can be distributed among the modules in a different manner than is described here. Certain modules and functions can be incorporated into other modules of the document browsing server 105 and/or other entities on the network 150, including the client 155.

A data storage 124 stores data used by the various modules of the document browsing server 105. The stored data include the electronic documents, user interactions with pages of the documents as received by the interaction collection module 303 and scores of the pages as determined by the page scoring module 305. The data storage 124 may also store other data as well. For example, in an embodiment where a user creates an account, the user's account information may be stored at the data storage 124.

The interaction collection module 303 receives interactions of multiple users of multiple different clients 155 with electronic documents. Interactions are user actions at the clients 155 related to the electronic document. A user reading or viewing an electronic document leads to interactions that are received by the interaction collection module 303. Examples of interactions received include opening a document, how long users have viewed a page in a document (as determined by how long the page was left displayed on that user's client 155), users interacting with individual portions of the page (such as zooming in on a portion of the page, mousing over or clicking on an image or piece of text), users annotating content on the page, etc. The interaction collection module 303 stores this information in the data storage 124.

The page scoring module 305 determines the scores for pages of electronic documents provided by the document browsing server 105 as discussed in reference to FIG. 1. The score for a page determined by the page scoring module 305 is an approximation of how interesting the page would be to a user browsing through a physical document, like a magazine, and how likely a reader would be to stop browsing at that page to examine that page further. In some embodiments, the score also takes into account factors that would not be apparent to someone browsing through a physical document and thus is an improvement on browsing through a physical document. The score incorporates data extrinsic to the page ("extrinsic components") and data intrinsic to the page ("intrinsic components").

The extrinsic components include a measurement of the number and quality of interactions with the page captured by the interaction collection module 303. Generally, the score is higher when there are more interactions with a page. A page that is viewed by more users than another page will be scored higher. More time spent on a page by the users will result in a higher score. More interactions with a page like zooming in on a portion of the page or clicking on an image will also result in a higher score.

The intrinsic components include metadata about the page. Metadata are the characteristics that are inherent to the page itself. Examples of metadata include how many, if any, images there are on a page; whether the page comprises the beginning of an article, chapter or other subdivision of the document; and determining the presence of particular words on the page. In part, the scoring of a page using metadata models how interesting the page would be in hard copy form if the user were flipping through the physical document. Thus the score is increased if there are images and/or the page is the beginning of an article or book chapter because a reader of a physical document is more likely to stop browsing on a page that is the beginning of an article or chapter as well as more likely to stop browsing on a page with an image. The image contribution to the score can be refined even more based on the size and quantity of images on the page. One large image can result in a higher score than one small image. Multiple images can result in a higher score than one image. In assessing the words on the page, the presence of words that are relevant to the popular culture at the time of the assessment would result in a higher score for the page. For example, in the case of an electronic document that is a magazine, the presence of a word associated with a current news item would result in a higher page score.

Certain of the interactions are combined and their effect on the score is based on the combination. Annotation is one example. Frequent annotation of a page by users results in a higher score for the page. However, when the annotation interaction is combined with other interactions, the opposite can be true. If a page is frequently annotated, frequently viewed and users spend a large amount of time on the page, the score may be lower for the page. This is because many users viewing the page for a significant amount of time and annotating the page may indicate that many users find inaccuracies or find the page questionable for another reason. If instead, the page is viewed by many users and for a long period of time and without significant annotation, it could indicate the page is particularly compelling and thus worthy of a higher page score.

In one embodiment the page scoring module 305 determines the score for a page based on both the intrinsic and extrinsic components. The page scoring module 305 assigns weights to one or more aspects of the extrinsic and intrinsic components and sums the results to provide the score. In some embodiments, the weights assigned to the components and the individual components used are updated periodically based on an assessment of how predictive the algorithm is of page popularity with users. The assessment involves comparing a page's score to a popularity ranking of pages based on the extrinsic components. In some embodiments the popularity ranking of the pages based on the extrinsic components is ranking the pages by amount of time spent on the page.

In some embodiments, the page scoring module 305 utilizes only intrinsic components to determine the score. For example, if the electronic document is new to the document browsing server 105, the interaction collection module 303 may not have received sufficient interactions to provide useful data for the page scoring module 305 to base a score on those interactions. In yet another alternate embodiment, the page scoring module 305 utilizes only extrinsic components to determine a page score. For example, if an electronic document has been widely viewed, the captured interactions may be much more informative as to the level of interest of a particular page. It is also possible to use weights to weigh the intrinsic or extrinsic components appropriately using the above considerations—the more interactions are collected, the less weight the page scoring module 305 assigns the intrinsic components in determining the score for a page.

The page scoring module 305 updates the scores of the pages in the stored electronic documents periodically to make use of new interactions or other extrinsic components collected from other users of the electronic documents. Such updating may happen daily or weekly or on demand. Additionally or alternatively, the page scoring module 305 determines scores for individual pages as needed when the document browsing server 105 responds to browse requests.

The document organization module 307 divides documents into segments. In one embodiment, each segment of a document has the same number of pages. However, the number of pages in a segment need not be the same for all electronic documents. In one embodiment, the number of pages in a segment is determined based on the type of document and the total length of the document. The document organization module 307 identifies each page in an electronic document that is the first page of a segment and that page is identified as such in the data storage 124.

The document and page serving module 301 receives requests from the client 155 for documents and provides the requested documents to the client 155. Additionally, the document and page serving module 301 receives a browse request from the client 155. The browse request includes a direction to browse—forward or backward through the document—and an indication of the page currently displayed at the client 155. The page serving module 301 serves a page to the client 155 in response to the browse request. The page to be served is provided to the document and page serving module 301 by the page selection module 309.

The page selection module 309 determines the page to be provided in response to a browse request. The page selection module 309 determines a set of candidate pages to be ranked. In one embodiment, the set of candidate pages includes a range of pages around the first page of a segment adjacent to the segment currently being displayed on the client 155. The segment currently being displayed is identified by determining the segment in which the page currently displayed at the client resides. The page selection module 309 then identifies the segment adjacent to the current segment, and the first page of this adjacent segment. The page selection module 309 selects pages that are x pages before and x pages after the first page of the adjacent segment, where x is an integer such as 3, 5, or 10, for the set of candidate pages. In one embodiment, if the browse request indicates to browse backwards through the document, the page selection module 309 selects pages within a specified range of the first page of the current segment, rather than from within the prior adjacent segment.

The candidate set of pages can be any size but is preferably 20 pages or fewer. This results in a candidate set that is small enough that the page provided in response to the browse request is not too far from where the user was in the electronic document which again provides for a simulation of browsing through a hard copy document. The candidate set of pages are ranked according to the score for each page determined by the page scoring module 305. The highest ranking page is provided to the client 155.

Figure 4:
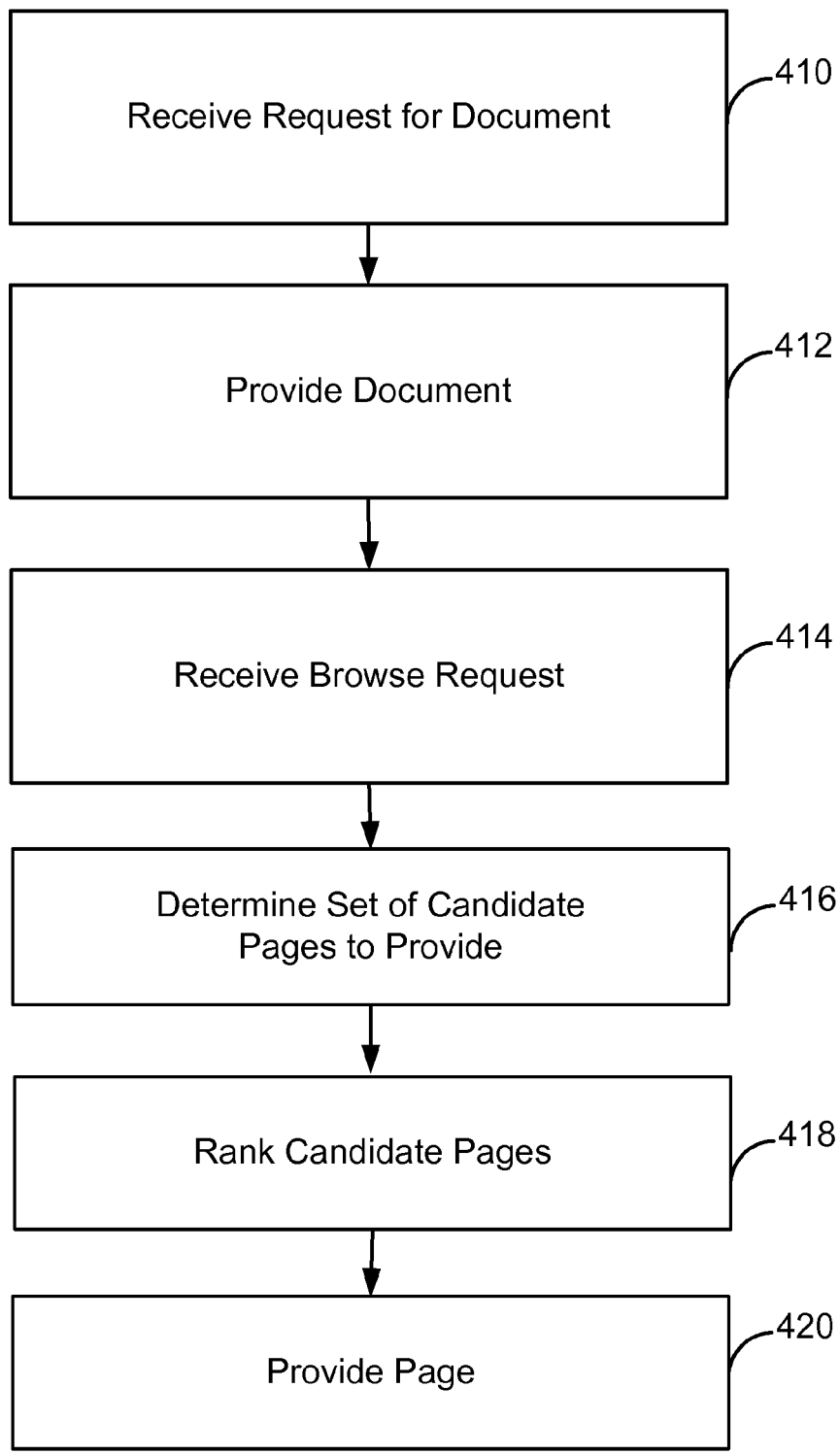
FIG. 4 illustrates the operation of the document browsing server according to one embodiment.

FIG. 4 illustrates the operation of the document browsing server 105. Initially, the document and page serving module 301 receives 410 a request for a document. The requested document is retrieved from the data storage 124 and provided 412 to the client 155. The document may be provided in its entirety or just an initial amount of the document, for example the first segment, is buffered onto the client 155.

The document and page serving module 301 then receives 414 a browse request from the client 155. For example, if the request is to browse forward, using the identifier of the page currently displayed on the client 155, the page selection module 309 determines the segment that includes the current page. The page selection module 309 then identifies the first page of the next segment in the document and a range of pages on either side of the first page. For example, the page selection module 309 may select three pages to either side of the first page of the next segment and thus form a candidate set having seven pages. For each page in the candidate set, the page selection module 309 retrieves from the data storage 124 the score determined for that page. The page selection module 30 ranks the pages by their scores and provides the highest ranking page to the document and page serving module 301 to provide to the client 155. Should the request be to browse backwards, the candidate set of pages are a range of pages around the first page of the segment currently displayed to the user. Alternatively, the candidate set of pages are a range of pages around the first page of the segment before the segment currently displayed to the user. The process then proceeds as for a request to browse forward.

In some embodiments, the page selection module 309 requests the scores for the pages from the page scoring module 305 at the time of receiving the browse request rather than retrieving a previously determined score stored in the data storage 124.

Further, in some embodiments the document browsing server 105 is located on the client 155. The interaction collection module 303 receives interactions of other users with the locally stored electronic documents periodically from a remotely located server. In such an embodiment real-time updating of page scores in response to a browse request is more efficient than when the document browsing server 105 communicates with the client 155 over a network 150.

In some embodiments, users have created user profiles at the document browsing server 105 and have provided particular areas of interest, and the scores include intrinsic and/or extrinsic components describing the pages' strength of association with the various areas of interest. In such an embodiment, if pages are scored at the time of providing a page in response to a browse request, the page scoring module 305 accesses a user's profile at the data storage 124 as part of the determination of the score for the candidate pages.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for browsing an eBook implemented on a computer comprising a processor, the method comprising:
   segmenting the eBook into a plurality of segments, each segment including a plurality of pages and a first page of the segment;
   receiving from a client a browse request including an identifier of a current page in the eBook;
   determining by the processor a set of candidate pages based on the identifier of the current page, each candidate page associated with a score, the determining comprising:
      determining, responsive to the browse request, a current segment containing the current page and an adjacent segment adjacent to the current segment; and
      selecting a predetermined number of pages before and after the first page of the adjacent segment as the set of candidate pages;
   selecting a page from among the set of candidate pages based on the scores; and
   providing the selected page to the client in response to the browse request.

2. The method of claim 1 further comprising:
   calculating a score for a candidate page in the set, the score indicating a measure of how interesting the candidate page is likely to be to a user of the client.

3. The method of claim 2 wherein calculating the score for the candidate page comprises:
   calculating the score responsive to extrinsic components of the candidate page, the extrinsic components including a measurement of a number of quality of interactions with the candidate page by a plurality of users of a plurality of different clients.

4. The method of claim 2 wherein calculating the score for the candidate page comprises:
   calculating the score responsive to intrinsic components of the candidate page, the intrinsic components describing characteristics inherent in the candidate page.

5. The method of claim 1 wherein the current page comprises a page of the electronic document displayed on the client computing device when the browse request is sent from the client computing device.

6. A non-transitory computer-readable storage medium storing executable program code for browsing an eBook, the computer program code comprising program code for:
   segmenting the eBook into a plurality of segments, each segment including a plurality of pages and a first page of the segment;
   receiving from the client a browse request including an identifier of a current page in the eBook;
   determining by the processor a set of candidate pages based on the identifier of the current page, each candidate page associated with a score, the determining comprising:
      determining, responsive to the browse request, a current segment containing the current page and an adjacent segment adjacent to the current segment; and
      selecting a predetermined number of pages before and after the first page of the adjacent segment as the set of candidate pages;
   selecting a page from among the set of candidate pages based on the scores; and
   providing the selected page to the client in response to the browse request.

7. The non-transitory computer-readable storage medium of claim 6 further comprising program code for:
   calculating a score for a candidate page in the set, the score indicating a measure of how interesting the candidate page is likely to be to a user of the client.

8. The non-transitory computer-readable storage medium of claim 7 wherein program code for calculating the score for the candidate page comprises program code for:
   calculating the score responsive to extrinsic components of the candidate page, the extrinsic components including a measurement of a number of quality of interactions with the candidate page by a plurality of users of a plurality of different clients.

9. The non-transitory computer-readable storage medium of claim 7 wherein program code for calculating the score for the candidate page comprises program code for:
   calculating the score responsive to intrinsic components of the candidate page, the intrinsic components describing characteristics inherent in the candidate page.

10. A computer system for browsing an eBook comprising:
    a processor for executing computer program code; and
    a non-transitory computer-readable storage medium storing executable program code for:
       receiving a browse request;
       segmenting the eBook into a plurality of segments, each segment including a plurality of pages and a first page of the segment;
       determining a current page in the eBook;
       determining by the processor a set of candidate pages based on the identifier of the current page, each candidate page associated with a score, the determining comprising:
          responsive to the browse request, determining a current segment containing the current page and an adjacent segment adjacent to the current segment; and
          selecting a predetermined number of pages before and after the first page of the adjacent segment as the set of candidate pages;
       selecting a page from among the set of candidate pages based on the scores; and
       providing the selected page in response to the browse request.

11. The system of claim 10 further comprising program code for:
    calculating a score for a candidate page in the set, the score indicating a measure of how interesting the candidate page is likely to be to a user of the client.

12. The system of claim 11 wherein program code for calculating the score for the candidate page comprises program code for:
    retrieving extrinsic components including a measurement of a number of quality of interactions with the candidate page by a plurality of users of the electronic document; and
    calculating the score responsive to the extrinsic components of the candidate page.

13. The system of claim 11 wherein program code for calculating the score for the candidate page comprises program code for:
    calculating the score responsive to intrinsic components of the candidate page, the intrinsic components describing characteristics inherent in the candidate page.

14. The system of claim 11 wherein calculating a score for a candidate page in the set comprises retrieving the score.

\* \* \* \* \*